H. Jenkins,
Wire Fence.
No. 1,338. Reissued Sept. 2, 1862.
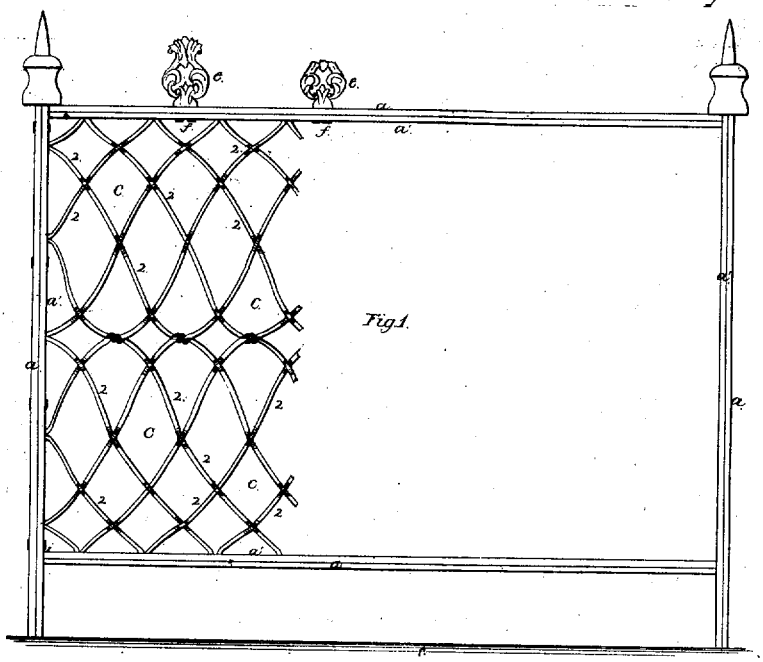
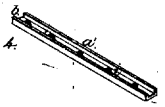
Fig. 4.
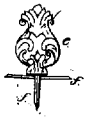
Fig. 5.
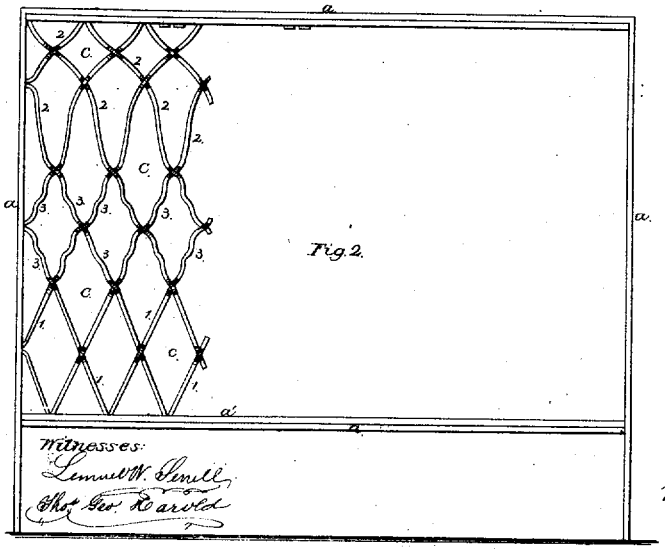
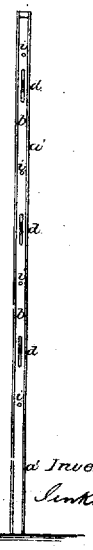
Fig. 3.
Witnesses:
Lemuel W. Serrell
Chas. Geo. Harold
Henry Jenkins Inventor.
N. PETERS, PHOTO-LITHOGRAPHER, WASHINGTON, D. C.

UNITED STATES PATENT OFFICE.

HENRY JENKINS, OF BROOKLYN, NEW YORK.

IMPROVEMENT IN WIRE FENCES.

Specification forming part of Letters Patent No. 6,106 dated February 13, 1849; Reissue No. 1,338, dated September 2, 1862.

*To all whom it may concern:*

Be it known that I, HENRY JENKINS, formerly of Pottsville, in the State of Pennsylvania, now of Brooklyn, in the county of Kings and State of New York, have invented an Improved Method of Manufacturing Wrought-Iron Fence; and I do hereby declare that the following is a full, clear, and exact description of the principle or character which distinguishes it from all other things before known, and of the manner of making, modifying, and using the same, reference being had to the accompanying drawings, described herein, in which—

Figure 1 is an elevation of my improved fence. Fig. 2 is a similar view of a different pattern of fence. Fig. 3 is a side view of the bar surrounding the same. Fig. 4 is a perspective view of said bar, and Fig. 5 represents one of the top ornaments or pickets.

Similar marks of reference denote the same parts.

My invention consists of forming a fence of wrought-iron in a cheap and economical manner by the construction and arrangement of its several parts, by which a light and durable fence of a highly ornamental character can be made at as cheap a rate as one formed of cast-iron, and in many cases cheaper.

My improvement is as follows: The frame of the panel is composed of bars of wrought-iron, *a a'*, rolled with a groove, *b*, in them, and where every part of said frame is composed of two such bars put together, as shown in Fig. 1, with the grooves turned inward, they compose a strong rail and upright post, appearing as massive and strong as if solid, but comparatively light in weight, being hollow. The inner bars, *a'*, of this frame are punched or drilled with holes *i* (see Figs. 3 and 4) at proper distances apart, according to the figure that the center work of the panel is intended to be. This center work, *c*, is composed of heavy wire mesh-work in any figure, samples of which are shown in the drawings, but from which it is obvious that many deviations can be made, to suit the taste of the manufacturer.

The wires or rods are prepared for the fence by crimping or indenting them at the points where other wires are to cross, and then the wires are woven together, and the ornamental appearance of the fence is obtained by the shapes given to the said wires, which ornamental appearance is rendered permanent by the crimping or indenting aforesaid preventing the wires slipping at the points of intersection. Wires have been twisted or laid together to form ornamental screens before my invention, and the wires secured to each other at the points of intersection by a separate binding of wire; but the use of the indentations or crimps renders such binding unnecessary, and I am able to obtain a great variety of ornamental patterns in the fence by various combinations of the elementary principles shown in the drawings. In Figs. 1 and 2 each wire or rod is bent into the shape indicated by the red line, and provided with crimps or indentations at points where other wires are to pass, and then the wires are afterward woven to form the panel or section of iron-work.

It will be seen that at 1 1 an ornamental appearance is obtained by the wire being straight between the crimps or points of crossing and of equal lengths between said points.

At 2 2 the ornamental appearance is produced by a curvature of the wire or rod, rendering it necessary to crimp the wire at unequal distances along its length, so as to coincide with the points at which the wires cross.

At 3 3 the ornamental appearance is produced by bending the wire or rod in a zigzag or wavy line between the points of intersection, and when laid together this zigzag shape lies in the plane of the panel or section of the fence or other structure, while the crimps at the points of intersection are at right angles to the plane of the fence.

In Fig. 1 the wires or rods are shown as twisted together, as has before been done; but by combining this feature with those aforesaid, of crimping or indenting, the extent of ornamental character of iron work is very much increased. By this mode of preparing the wires or rods any desired ornamental shapes of woven-work can be produced and rendered permanent. When woven into form, the ends of the wires or rods are passed through the holes *i* in the grooved bar, and then turned down into the groove, as clearly shown at *d*, Fig. 3. Another bar, *a*, is then put over them and they are held secure. This forms an important part of my improvement, for it is well known that the end of a wire in such a position is a most difficult thing to rivet, which would be absolutely necessary, (had I not provided a groove for the ends to lie in,) and would double the cost of manufacture; but by this simple construction, arrangement, and application of parts I entirely obviate the necessity of riveting, and make a smooth, durable, and cheap structure by placing the cap rail or bar over the ends of the wire turned up in the groove, which completes the construction and gives a finished appearance to the work.

If ornaments are used on the top rail, as at *e e e* in the drawings, they may be formed with a split pin, *f*, as seen in Fig. 5. Holes are bored or punched in the top or cap bar, and the split pins are put through them, after which they are spread, as indicated by the red lines in the same figure. By this means they are securely fastened.

What I claim, and desire to secure by Letters Patent, is—

1. An iron fence or other article formed by the combination of woven wires or rods with grooved bars surrounding the same and receiving the ends of the wires, in the manner specified, and for the purpose set forth.

2. Forming the surrounding metallic frame of a woven wrought-iron panel by the employment of two bars attached to each other and having between them the ends of the wires or rods forming the wrought-iron work, substantially as specified.

3. Crimping straight wires or rods in opposite directions at the required distances apart and weaving said wires or rods together to form meshes, as set forth, whereby the general straight form of the wire is maintained, except at the points where the wires cross, as specified.

4. Crimping wires or rods at different or irregular distances along their lengths, in order that said wires or rods, when woven together, shall form open iron-work with meshes of different shapes, substantially as set forth.

5. Wires or rods crimped in the opposite directions and formed with bends between the crimps at right angles to them and woven together, as specified, whereby the crimps set into each other at the points of intersection and the aforesaid bends regulate the shape of the meshes, as set forth.

HENRY JENKINS.

Witnesses:
LEMUEL W. SERRELL,
THOS. GEO. HAROLD.